(12) United States Patent
Arnault et al.

(10) Patent No.: US 11,371,597 B2
(45) Date of Patent: Jun. 28, 2022

(54) PULLEY DEVICE FOR TENSIONER OR WINDER ROLLER

(71) Applicant: Aktiebolaget SKF, Gothenburg (SE)

(72) Inventors: Benoit Arnault, Saint-Cyr-sur-Loire (FR); Nicolas Tronquoy, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 572 days.

(21) Appl. No.: 16/283,960

(22) Filed: Feb. 25, 2019

(65) Prior Publication Data

US 2019/0277388 A1 Sep. 12, 2019

(30) Foreign Application Priority Data

Mar. 6, 2018 (FR) ..................................... 1851905

(51) Int. Cl.
| | |
|---|---|
| *F16H 55/36* | (2006.01) |
| *F16C 19/08* | (2006.01) |
| *F16H 7/20* | (2006.01) |
| *F16H 7/08* | (2006.01) |
| *F16C 19/18* | (2006.01) |
| *F16C 13/00* | (2006.01) |

(52) U.S. Cl.
CPC ........... *F16H 55/36* (2013.01); *F16C 13/006* (2013.01); *F16C 19/08* (2013.01); *F16C 19/18* (2013.01); *F16H 7/08* (2013.01); *F16H 7/20* (2013.01); *F16H 2007/0865* (2013.01)

(58) Field of Classification Search
CPC .......... F16H 55/36; F16H 55/42; F16H 55/44; F16H 55/46; F16H 55/48; F16H 55/566; F16H 7/12; F16H 7/14; F16H 7/16; F16H 7/1254; F16H 2007/185; F16H 2007/0865

USPC .......................................................... 474/199
See application file for complete search history.

(56) References Cited

U.S. PATENT DOCUMENTS

| | | | |
|---|---|---|---|
| 1,482,579 | A | 2/1924 | Nice |
| 1,627,558 | A | 5/1927 | Grunwald |
| 1,845,631 | A | 2/1932 | Seelbach |
| 1,848,144 | A | 3/1932 | Pribil |
| 1,903,776 | A | 4/1933 | Clark et al. |
| 2,137,987 | A | 11/1938 | Smith |
| 2,198,831 | A | 4/1940 | Moyer |
| 2,315,357 | A | 3/1943 | Smith |
| 2,349,281 | A | 5/1944 | Kendall |
| 2,530,665 | A | 11/1950 | Searles |
| 2,655,813 | A | 10/1953 | Howell |
| 2,669,878 | A | 2/1954 | Thomas |

(Continued)

FOREIGN PATENT DOCUMENTS

| | | |
|---|---|---|
| DE | 19836191 A1 | 2/2000 |
| DE | 10036765 A1 | 2/2002 |

(Continued)

*Primary Examiner* — Gene O Crawford
*Assistant Examiner* — Emily Rose Kincaid
(74) *Attorney, Agent, or Firm* — Garcia-Zamor Intellectual Property Law; Ruy Garcia-Zamor; Bryan Peckjian

(57) ABSTRACT

A pulley device for a belt tensioner or winder roller having a bearing, a pulley mounted to the bearing, a protection flange and a screw. The protection flange includes an axial portion that is able to pass from an undeformed first configuration for positioning the flange on the bearing to a deformed second configuration for axial and radial retention of the flange.

5 Claims, 9 Drawing Sheets

(56) References Cited

U.S. PATENT DOCUMENTS

| | | |
|---|---|---|
| 3,367,199 A | 2/1968 | Dankowski |
| 3,490,285 A | 1/1970 | Schaeffler et al. |
| 3,767,279 A | 10/1973 | Hallerback |
| 3,789,683 A | 2/1974 | Frost |
| 3,825,312 A | 7/1974 | Allaben |
| 3,871,241 A | 3/1975 | Pestka et al. |
| 3,881,789 A | 5/1975 | Kornylak |
| 3,918,277 A | 11/1975 | Nakk |
| 3,990,136 A | 11/1976 | Hishida |
| 4,010,987 A | 3/1977 | Jasperse et al. |
| 4,033,196 A | 7/1977 | Maeda |
| 4,073,551 A | 2/1978 | Sutowski |
| 4,402,678 A | 9/1983 | St John |
| 4,443,210 A | 4/1984 | Olschewski et al. |
| 4,457,740 A | 7/1984 | Olschewski et al. |
| 4,474,562 A | 10/1984 | Heurich |
| 4,504,252 A | 3/1985 | Honma |
| 4,516,962 A | 5/1985 | Brandenstein et al. |
| 4,518,372 A | 5/1985 | Dye |
| 4,534,749 A | 8/1985 | Hans et al. |
| 4,557,708 A | 12/1985 | Brandenstein et al. |
| 4,568,316 A | 2/1986 | Veikley et al. |
| 4,571,227 A | 2/1986 | Colanzi et al. |
| 4,591,352 A | 5/1986 | Olschewski et al. |
| 4,610,645 A | 9/1986 | Donn et al. |
| 4,610,646 A | 9/1986 | Walter et al. |
| 4,668,209 A | 5/1987 | Kyoosei et al. |
| 4,831,705 A | 5/1989 | Kanemitsu |
| 4,917,655 A | 4/1990 | Martin |
| 5,630,769 A | 5/1997 | Schmidt et al. |
| 5,725,448 A | 3/1998 | Kato et al. |
| 5,728,020 A | 3/1998 | Muranaka et al. |
| 5,913,743 A | 6/1999 | Ohta |
| 6,001,037 A | 12/1999 | Rocca et al. |
| 6,010,420 A | 1/2000 | Niki et al. |
| 6,102,822 A | 8/2000 | Nakazeki |
| 6,196,720 B1 | 3/2001 | Nozaki et al. |
| 6,220,982 B1 | 4/2001 | Kawashima et al. |
| 6,241,257 B1 | 6/2001 | Hauck et al. |
| 6,270,001 B1 | 8/2001 | Tadic et al. |
| 6,293,885 B1 | 9/2001 | Serkh et al. |
| 6,450,689 B1 | 9/2002 | Takatsu |
| 6,572,270 B2 | 6/2003 | Murakami et al. |
| 6,605,574 B2 | 8/2003 | Asao et al. |
| 6,659,649 B2 | 12/2003 | Ishiguro et al. |
| 6,692,393 B2 | 2/2004 | Fukuwaka et al. |
| 6,860,639 B2 | 3/2005 | Tabuchi et al. |
| 7,011,593 B2 | 3/2006 | Schenk et al. |
| 7,041,019 B2 | 5/2006 | Matsubara et al. |
| 7,108,623 B2 | 9/2006 | Cadarette et al. |
| 7,325,974 B2 | 2/2008 | Tanabe et al. |
| 7,364,522 B2 | 4/2008 | Miyata et al. |
| 7,435,005 B2 | 10/2008 | Schmidl et al. |
| 7,448,806 B2 | 11/2008 | Ishiguro et al. |
| 7,695,385 B2 | 4/2010 | Barraud et al. |
| 7,909,701 B2 | 3/2011 | Ishikawa et al. |
| 7,909,717 B2 | 3/2011 | Boussaguet et al. |
| 7,993,228 B2 | 8/2011 | Nosaka et al. |
| 8,012,053 B2 | 9/2011 | Filip |
| 8,167,750 B2 | 5/2012 | Hamada et al. |
| 8,172,056 B2 | 5/2012 | Barraud et al. |
| 8,235,851 B2 | 8/2012 | Eidloth et al. |
| 8,258,659 B2 | 9/2012 | Debrailly et al. |
| 8,506,434 B2 | 8/2013 | Harvey |
| 8,512,185 B2 | 8/2013 | Baer et al. |
| 8,617,016 B2 | 12/2013 | Dutil et al. |
| 8,651,988 B2 | 2/2014 | Kapfer et al. |
| 8,790,018 B2 | 7/2014 | Leuver et al. |
| 8,840,497 B2 | 9/2014 | Wilson et al. |
| 8,905,879 B2 | 12/2014 | Lannutti et al. |
| 9,028,352 B2 | 5/2015 | Wilson et al. |
| 9,206,838 B2 | 12/2015 | Mola et al. |
| 9,273,772 B2 | 3/2016 | Ichikawa et al. |
| 9,416,863 B2 | 8/2016 | Schaefer |
| 9,453,571 B2 | 9/2016 | Qin et al. |
| 9,682,621 B2 | 6/2017 | Dell et al. |
| 9,702,399 B2 | 7/2017 | Arnault et al. |
| 9,709,154 B2 | 7/2017 | Albrecht et al. |
| 9,834,083 B2 | 12/2017 | Blessing et al. |
| 9,841,096 B2 | 12/2017 | Bell |
| 9,927,017 B2 | 3/2018 | Van Den Heuvel |
| 10,030,758 B2 | 7/2018 | Basile et al. |
| 10,082,200 B2 | 9/2018 | Lescorail et al. |
| 10,088,031 B2 | 10/2018 | Koda et al. |
| 10,132,399 B2 | 11/2018 | Chollet et al. |
| 10,220,432 B2 | 3/2019 | Pan |
| 10,228,051 B2 | 3/2019 | Basile et al. |
| 10,274,013 B2 | 4/2019 | Pallini et al. |
| 10,393,252 B2 | 8/2019 | Liege et al. |
| 10,493,712 B2 | 12/2019 | Capoldi et al. |
| 10,520,029 B2 | 12/2019 | Iino et al. |
| 10,539,185 B2 | 1/2020 | Kunishima |
| 10,634,189 B2 | 4/2020 | Kunishima |
| 10,662,997 B2 | 5/2020 | Park |
| 2004/0097313 A1 | 5/2004 | Singer |
| 2004/0178398 A1 | 9/2004 | Miller et al. |
| 2008/0300077 A1 | 12/2008 | Kapfer et al. |
| 2009/0191999 A1 | 7/2009 | Joseph et al. |
| 2009/0298630 A1 | 12/2009 | Mineno et al. |
| 2011/0152025 A1 | 6/2011 | Wilson et al. |
| 2015/0125103 A1 | 5/2015 | Ciulla et al. |
| 2015/0141185 A1 | 5/2015 | Albrecht et al. |
| 2015/0292603 A1 | 10/2015 | Cherioux et al. |
| 2016/0327146 A1 * | 11/2016 | Lescorail ................ F16H 55/36 |
| 2016/0356375 A1 | 12/2016 | Chollet et al. |

FOREIGN PATENT DOCUMENTS

| | | | |
|---|---|---|---|
| DE | 102011077019 A1 * | 12/2012 | ............ F02B 67/06 |
| DE | 102011077019 A1 | 12/2012 | |
| FR | 3025276 A1 | 3/2016 | |
| FR | 3035928 A1 | 11/2016 | |
| WO | 2007085333 A1 | 8/2007 | |
| WO | 2009089265 A2 | 7/2009 | |

* cited by examiner

PULLEY DEVICE FOR TENSIONER OR WINDER ROLLER

CROSS-REFERENCE

This application claims priority to French patent application no. 1851905 filed on Mar. 6, 2018, the contents of which are fully incorporated herein by reference.

TECHNOLOGICAL FIELD

The present invention concerns the field of pulley devices for tensioner or winder rollers adapted to cooperate with a belt, for example a motor vehicle internal combustion engine drive or distribution belt.

BACKGROUND

Such rollers generally serve to maintain permanently a tension on the belt in a particular range or to modify locally the path taken by the latter. Reference is then made to tensioner rollers or winder rollers, respectively. In winder rollers, the pulley is mounted to rotate on a threaded body screw via a bearing, the roller then being fixed directly or indirectly to the engine block or to an element of the tensioner roller device, for example an articulated arm or an eccentric.

The bearing generally comprises a fixed inner race with a bore through which the screw passes, a rotating outer race surmounted by the pulley, and at least one row of rolling elements between the races.

Such devices are also equipped with additional protection flanges, helping to protect the device against pollution or projections from the outside environment. The flange also serves as a bearing washer for the head of the screw.

Pulley devices are preferably shipped to original equipment manufacturers or motor manufacturers equipped with their screws and their flanges. It is then desirable for the device to constitute an assembly that cannot be taken apart and is easy to manipulate and to transport, with no risk of coming apart accidentally, and having to be able to be mounted with no other particular protection by simply tightening the screw.

It is known from WO 2007/085333 A1 and DE 102011077019 A1 to provide a flange between the head of the screw and the inner bearing race. The flange is directly fixed axially and radially to the inner bearing race and includes interior projections for immobilizing the screw axially and preventing it from falling out during transportation.

However, a bearing for a pulley device may equally include a spacer between the inner race of the bearing and the body of the screw. Such a spacer generally has an exterior surface mounted in a bore in the inner race, a front surface against which the flange comes to bear, and a bore in which the body of the screw is housed.

It may be desirable to strengthen the axial and radial retention of the flange in the device, in particular when the latter includes a spacer.

SUMMARY

The present invention aims to remedy this disadvantage.
The present invention aims more particularly to provide a pulley device that is resistant to high levels of pollution, particularly economical, easy to mount and secure, forms a subassembly that cannot be taken apart, and is of small axial and radial overall size.

The invention concerns a pulley device for a belt tensioner or winder roller comprising a pulley, a bearing, a protection flange, and a screw.

The bearing has a rotating exterior race surmounted by the pulley and a fixed inner race, the races being coaxial and the bearing including a mounting bore.

The protection flange comprises an essentially radial portion bearing against a front surface of the bearing, an axial portion extending from an interior edge of the essentially radial portion, and a bore.

The screw comprises a body housed in the bores of the bearing and of the flange, and a screw head at one end of the body, the head bearing against the essentially radial portion of the flange.

According to the invention, the axial portion of the flange is configured so that it is able to pass from an undeformed first configuration to a deformed second configuration. The non-deformable first configuration corresponds to an axial portion in an undeformed initial configuration that extends in an axial or a substantially inclined direction toward the interior of the device, the outside diameter of the axial portion being strictly less than the inside diameter of the mounting bore of the bearing. The deformed second configuration corresponds to an axial portion deformed radially toward the exterior of the device and that comes to be housed in a circumferential groove provided in the mounting bore of the bearing.

According to other advantageous but non-essential features of the invention, separately or in combination:

The bearing is a smooth bearing.

The bearing is a bearing with rolling elements, at least one row of rolling elements being disposed radially between the outer and inner races of the bearing.

The rolling elements are balls.

A cage maintains the circumferential spacing of the rolling elements.

A washer is disposed between the screw head and the essentially radial portion of the flange.

The inner race of the bearing comprises a bore forming the mounting bore of the bearing.

The bearing comprises an annular spacer between the inner race and the body of the screw, the spacer having an exterior surface mounted in a bore in the inner race, a front surface against which the essentially radial portion of the flange comes to bear, and a bore forming the mounting bore of the bearing in which the body of the screw is housed.

The essentially radial portion of the flange comprises a first radial portion of small diameter and including an interior edge forming the bore of the flange and an exterior edge, a second radial portion of large diameter including an interior edge and an exterior edge, and an intermediate portion connecting the exterior edge of the first radial portion and the interior edge of the second radial portion.

The intermediate portion is cylindrical.

The intermediate portion is frustoconical.

The exterior edge of the second radial portion of large diameter extends in the immediate vicinity of the pulley in order to form a narrow passage.

The flange comprises retaining means for the screw.

The retaining means consist in at least one tongue cut into the essentially radial portion of the flange, the tongue extending toward the body of the screw.

The body of the screw comprises a smooth portion and a threaded portion.

The smooth portion is arranged axially between the screw head and the threaded portion.

The outside diameter of the smooth portion is strictly less than the outside diameter of the threaded portion.

The tongue extends radially in the immediate vicinity of or in contact with the smooth portion of the body of the screw.

The tongue comprises a plastically deformable part.

The axial portion is annular.

The axial portion is discrete, formed by a plurality of axial tongues.

The axial portion comprises at its free end a radial rim directed toward the interior of the device.

In the undeformed first configuration, the radial rim has an inside diameter strictly less than the outside diameter of the screw body.

At least one tongue extends axially from a free end of the axial portion in the direction of the head of the screw, the tongue being bent against the bore of the axial portion.

The tongue has an inside diameter strictly greater than the outside diameter of the body of the screw.

In the undeformed first configuration, the tongue has a free end extending axially beyond the essentially radial portion of the flange.

In the deformed second configuration, the head of the screw bears against the free end.

In the deformed second configuration, the at least one tongue is clamped against the smooth portion of the screw.

The pulley is made of metal, for example of steel.

The pulley is made of plastic material, for example of polyamide.

The pulley is formed by overmoulding plastic material onto the outer race of the bearing.

The flange is made of metal, for example of steel.

BRIEF DESCRIPTION OF THE DRAWINGS

The present invention will be better understood on studying the detailed description of a few embodiments taken by way of nonlimiting example and illustrated by the appended drawings, in which.

DETAILED DESCRIPTION

Figure 1:
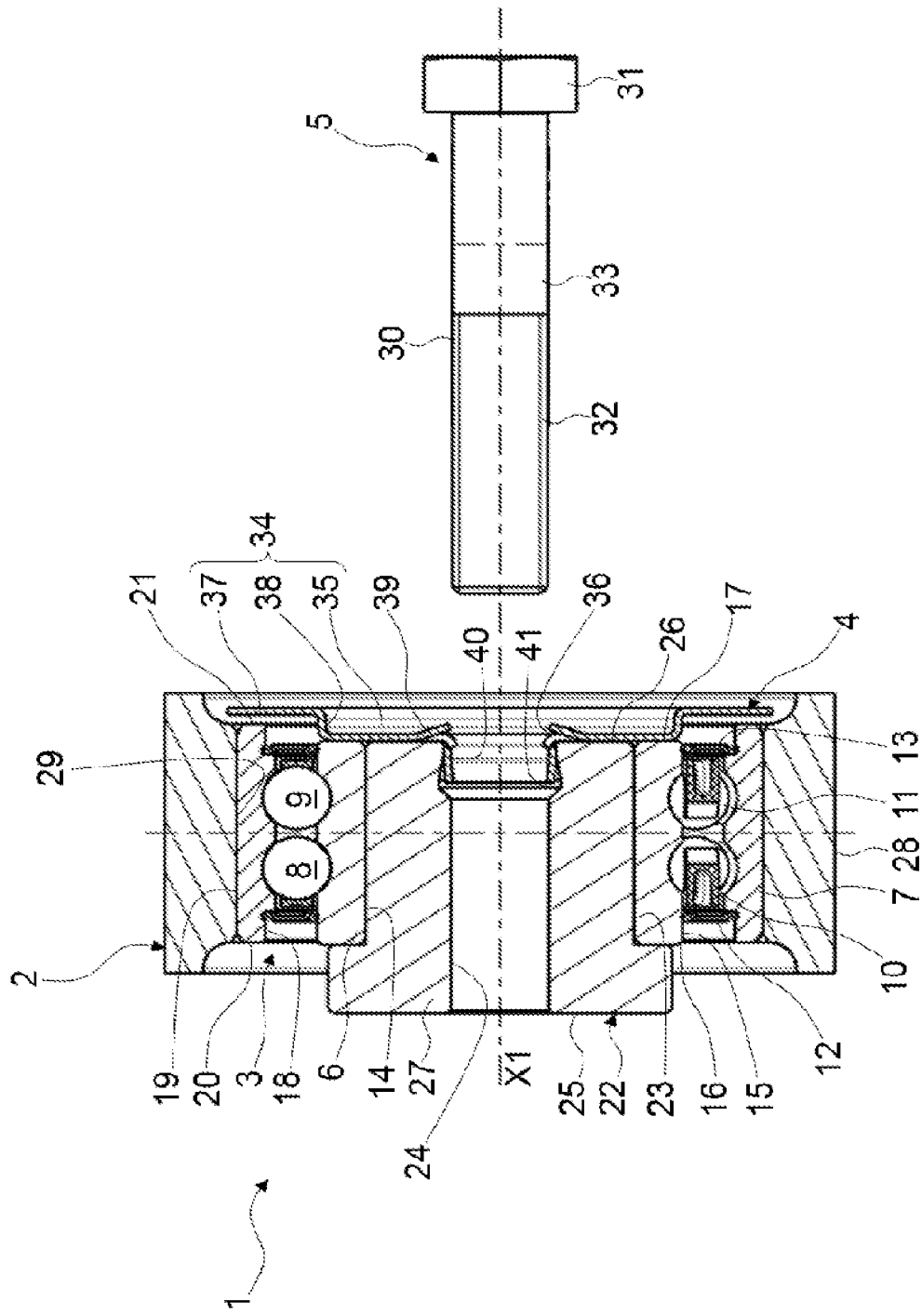
FIG. 1 is a view in axial section of a pulley device according to a first embodiment in an undeformed first configuration.

As can be seen in FIG. 1, a pulley device for a belt tensioner or winder roller, referenced 1 overall, has a geometrical axis X1 and comprises a pulley 2 adapted to cooperate with a belt (not shown), a bearing 3, a protection flange 4, and a screw 5.

The bearing 3 comprises a fixed inner race 6, a rotating outer race 7, two rows of rolling elements 8 and 9, here taking the form of balls, disposed between the races, and cages 10 and 11 maintaining the circumferential spacing of the rolling elements 8 and 9, respectively.

The bearing 3 advantageously comprises on each axial side an annular seal 12, 13 fixed to the outer race 7 to shut off the radial space that exists between the races 6, 7 and inside which the rolling elements 8, 9 are housed.

The inner race 6 and the outer race 7 are concentric. In the embodiment shown, the races are solid, that is to say obtained by machining or milling with removal of material from metal tubes, bars, forged parts or rolled blanks.

The inner race 6 comprises a bore 14, an external cylindrical surface 15 including rolling tracks having in axial section a concave internal profile suitable for the rolling elements 8, 9, and two front surfaces 16, 17.

The outer race 7 comprises a cylindrical bore 18 including rolling tracks having in axial section a concave internal profile suitable for the rolling elements 8, 9, an exterior cylindrical surface 19 on which the pulley 2 is mounted, and two front surfaces 20, 21.

Alternatively, the bearing may comprise a different number of rows of rolling elements arranged between the inner and outer races, for example a single row of rolling elements.

Alternatively, the bearing may comprise other types of rolling elements, for example conical rollers, needle rollers, or conical rollers. Alternatively, the bearing may be a smooth bearing.

In the embodiment shown in FIG. 1, the bearing 3 further comprises a spacer 22. The spacer 22 is annular and has an exterior surface 23 mounted in the bore 14 of the inner race 6, a bore 24 forming the mounting bore of the bearing 3, and two front surfaces 25, 26.

The spacer 22 extends axially out of the bearing 3 in the axial direction toward a support on which the pulley device 1 is intended to be mounted. The spacer 22 advantageously comprises a radial rim 27 against which the front face 16 of the inner race 6 of the bearing 3 may come to bear. On the axial side opposite this bearing engagement with the inner race 6, the radial rim 27 comprises a surface to bear against the support of the device 1. Such a spacer 22 allows adjustment of the spacing between the pulley device 1 and its support to suit the application.

Alternatively, the bearing 3 does not comprise any spacer, the bore 14 of the inner race 6 forming the mounting bore of the bearing 3.

The pulley 2 comprises a cylindrical exterior surface 28 intended to cooperate with a belt and an interior surface 29 fastened to the outer race 7. The pulley has an essentially tubular shape and is centered on the central axis X1.

The pulley 2 may advantageously be made of plastic material, preferably of polyamide, for example of PA6 or PA66. The pulley 2 may advantageously be formed by overmoulding plastic material onto the outer race 7 of the bearing 3. The result of this is excellent cohesion between these parts. Alternatively, the pulley 2 may be made of metal, for example of steel, and a tight fit onto the cylindrical exterior surface 19 of the outer race 7. The pulley 2 may equally have other shapes optimized as a function of the requirements of the application.

The screw 5 comprises a body 30 and a head 31 at one end of the body 30. The body 30 comprises a threaded portion 32 and a smooth portion 33 between the threaded portion 32 and the head 31. The body 30 is housed in the mounting bore of the bearing 3, here the bore 24 of the spacer 22.

The protection flange 4 comprises an essentially radial portion 34 with a first radial portion 35 of small diameter having an interior edge forming the bore 36 of the flange 4 and an exterior edge, a second radial portion 37 of larger diameter having an interior edge and an exterior edge, and a cylindrical intermediate portion 38 connecting the exterior edge of the first radial portion 35 and the interior edge of the second radial portion 37. Alternatively, the intermediate portion 38 may be frustoconical.

The exterior edge of the second radial portion 37 of larger diameter extends in the immediate vicinity of the pulley 2 in order to form a narrow passage that reduces the risk of intrusion of exterior pollution in the vicinity of the bearing 3, and more particularly of the bearing surfaces between the rolling elements 8, 9, the inner race 6 and the outer race 7. Of course, the seals 12, 13 participate in this sealing and further reduce the risk of unwanted ingress, the flange 4 forming a first barrier in a highly polluted environment.

The first radial portion 35 comes to bear against the front surface 17 of the inner race 6 and the front surface 26 of the spacer 22 situated opposite the rim 27 and thus of the support on which the device 1 is intended to be mounted.

The head 31 of the screw 5 has a relatively plane surface coming to bear against the first radial portion 35 of the flange 4, the first radial portion 35 being axially wedged between the head 31 of the screw 5 and the inner race 6 of the bearing 3. In a variant not shown, a washer may be disposed between the screw head and the essentially radial portion of the flange.

In the embodiment shown in FIGS. 1 to 4, the essentially radial portion 34 of the flange 4 comprises two tongues 39 cut into the portion 34.

The tongues 39 are radially opposite one another and are identical. Alternatively, the flange 4 may comprise a single tongue or more than two.

Each of the tongues 39 extends toward the body 30 of the screw 5. Each tongue has an interior free end with a bore forming part of the bore 36 of the flange 4.

In this embodiment, the interior free ends are frustoconical and extend globally axially toward the head 31 of the screw 5. The tongues 39 are therefore able to pass from a free state shown in FIGS. 1 and 2 to a deformed state shown in FIG. 3. In this deformed state an axial force comes to be applied to the screw 5 in its direction of insertion. The force is such that the head 31 comes to exert an axial force on the ends of the tongues 39 and thus to deform them until they are crushed completely against the front surface 26 of the spacer 22. The force may if necessary be applied via a washer between the screw head and the flange. The tongues 39 then extend entirely radially. The extent of the ends of each tongue 39 in the axial direction is moved to the radial direction, this increasing the radial length of each tongue 39. The interior free ends of the tongues 39 then come into the immediate vicinity of or in contact with the body 30 of the screw 5.

The screw 5 is advantageously configured so that the tongues 39 extend toward the smooth portion 33 of the body 30. This prevents all risk of contact with the screwthread.

The screw 5 is therefore retained axially and radially by the tongues 39 of the flange 4. According to alternatives not shown, the tongues may have another type of deformable part, for example bosses. FIGS. 1 to 4 offer a flange with tongues for retaining the screw, but the flange 4 may include other means for retaining the screw 5, examples being given in the remainder of the description.

The flange 4 also comprises an axial portion 40 extending axially from the interior edge of the first radial portion 35. The axial portion 40 comes to be housed in and fastened into a circumferential groove 41 in the mounting bore 24 of the bearing 3. In this embodiment, the axial portion 40 is annular. In another variant not shown, the axial portion may be discrete and formed by a plurality of axial tongues.

Figure 2:
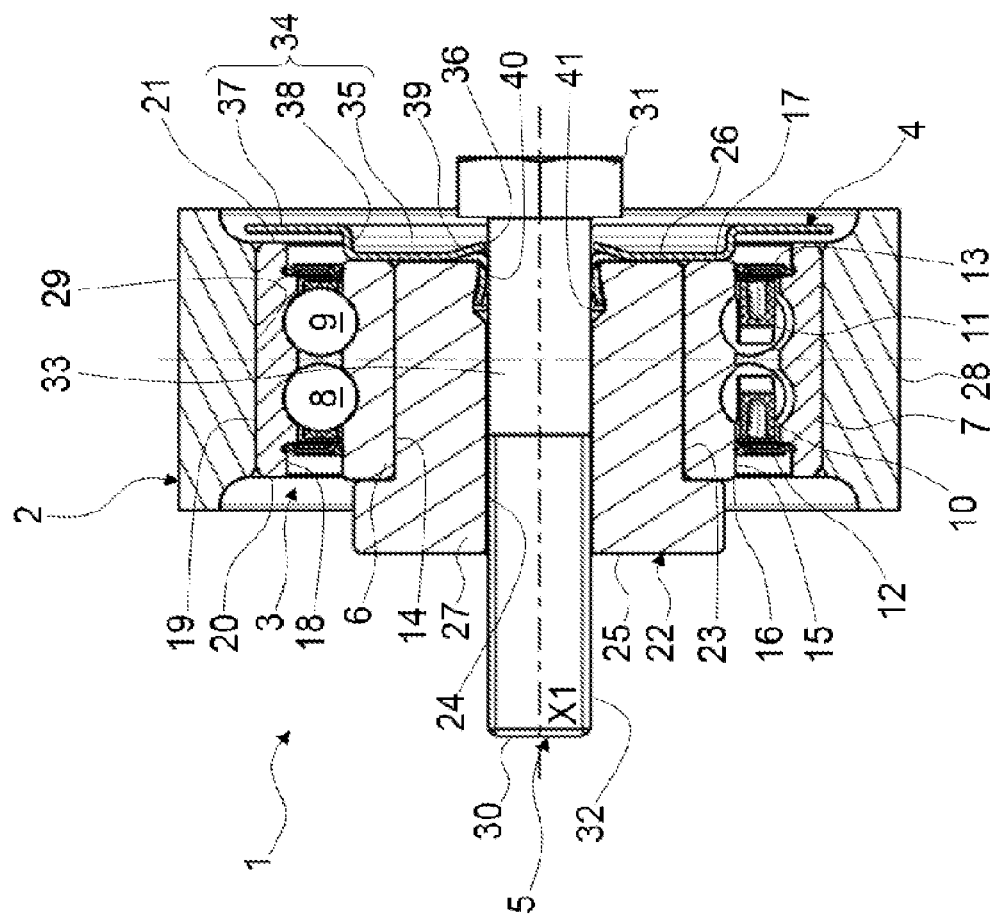
FIG. 2 is a view in axial section of the pulley device according to the first embodiment in a deformed second configuration.
Figure 3:
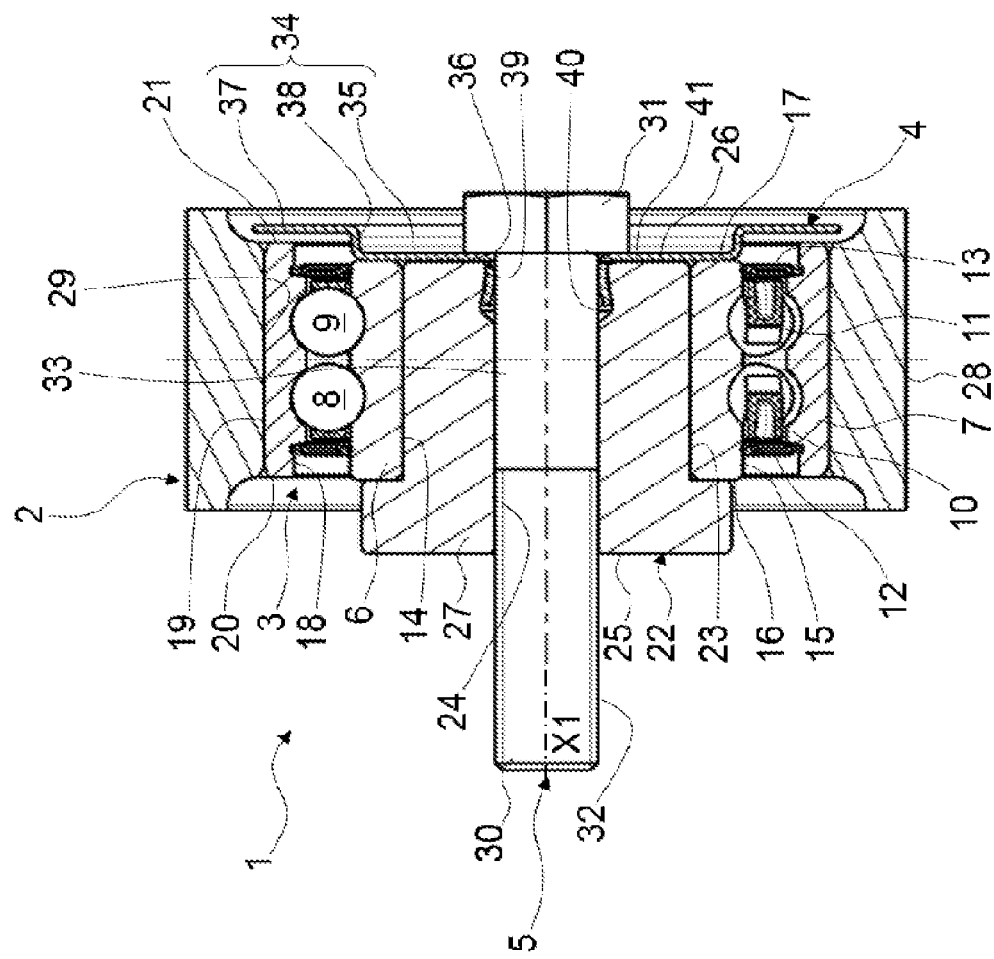
FIG. 3 is a view in axial section of the pulley device according to the first embodiment in an assembled configuration.

According to the invention, the axial portion 40 is configured so that it is able to pass from an undeformed first configuration shown in FIG. 1 to a deformed second configuration shown in FIGS. 2 and 3.

Figure 4:
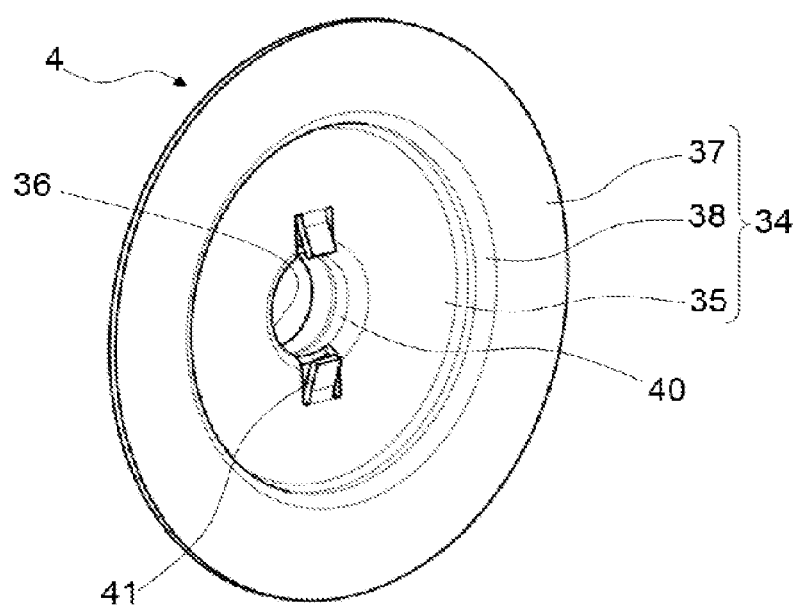
FIG. 4 is a front perspective view of a flange for the pulley device from FIG. 1.

According to the first embodiment of the invention, in the undeformed first configuration shown in FIGS. 1 and 4 the axial portion 40 is in an undeformed initial configuration that extends in a substantially inclined direction toward the interior of the device, the outside diameter of the axial portion 40 being strictly less than the inside diameter of the mounting bore 24 of the bearing 3. Alternatively, the axial portion may extend only axially in the bore 24.

Thanks to this first configuration, the flange 4 can easily be positioned on the bearing 3, the axial portion 40 of the flange coming to be housed without force in the bore 24 of the spacer 22 until the essentially radial portion 34 comes to bear against the front surfaces 17, 26 of the inner race 6 and of the spacer 22 of the bearing 3.

According to the first embodiment of the invention, in the deformed second configuration shown in FIG. 2 the axial portion 40 has been deformed radially toward the exterior of the device 1 so as to come to be housed in the circumferential groove 41 provided in the bore 24 of the spacer 22. The radial deformation of the axial portion 40 may be produced by an external tool inserted in the bore 36 of the flange 4 once the latter has been positioned on the bearing 3, the tool having an end that can be enlarged radially and therefore come to press the radial portion 40 into the groove 41. Alternatively, the axial portion 40 may be deformed radially outward by the insertion of the body 30 of the screw 5.

According to a variant of the invention not shown, the circumferential groove 41 may be provided in the bore 14 of the inner race 6 when the bearing does not comprise any spacer 22.

According to the first embodiment of the invention, in the deformed and assembled second configuration shown in FIG. 3 the screw 5 has been inserted in the bores 36, 24 of the flange 4 and of the bearing 3, respectively, until the head 31 of the screw 5 comes to bear against the essentially radial portion 34 of the flange 4, and more particularly after deformation of the tongues 39 to provide the radial and axial retention of the screw.

The flange 4 provides the centring of the screw 5 guaranteeing the coaxial relationship of the screw 5 on the one hand and of the pulley 2 and of the bearing 3 on the other hand, which may facilitate the screwing of the screw 5 onto a support provided with a threaded hole for this purpose.

Thanks to the invention, the result of this is that the pulley device 1 forms an assembly that cannot be dismantled constituted by the pulley 2, the bearing 3 with the spacer 22, the flange 4 and the screw 5. A device of this kind can easily be manipulated, transported and then installed on an assembly line with no risk of loss of parts and then installed on a support by screwing the screw into a threaded hole provided for this purpose with no other particular preparation.

The flange 4 may be fabricated economically by cutting and pressing a sheet metal, for example steel, blank.

As can be seen in FIG. 3, the head 31 of the screw 5 is flush with the radial plane defining the overall exterior size of the pulley 2. The screw 5 and the flange 4 therefore do not increase the overall size of the assembly, the overall size remaining that defined by the pulley 2 on the exterior side of the device 1.

Figure 5:
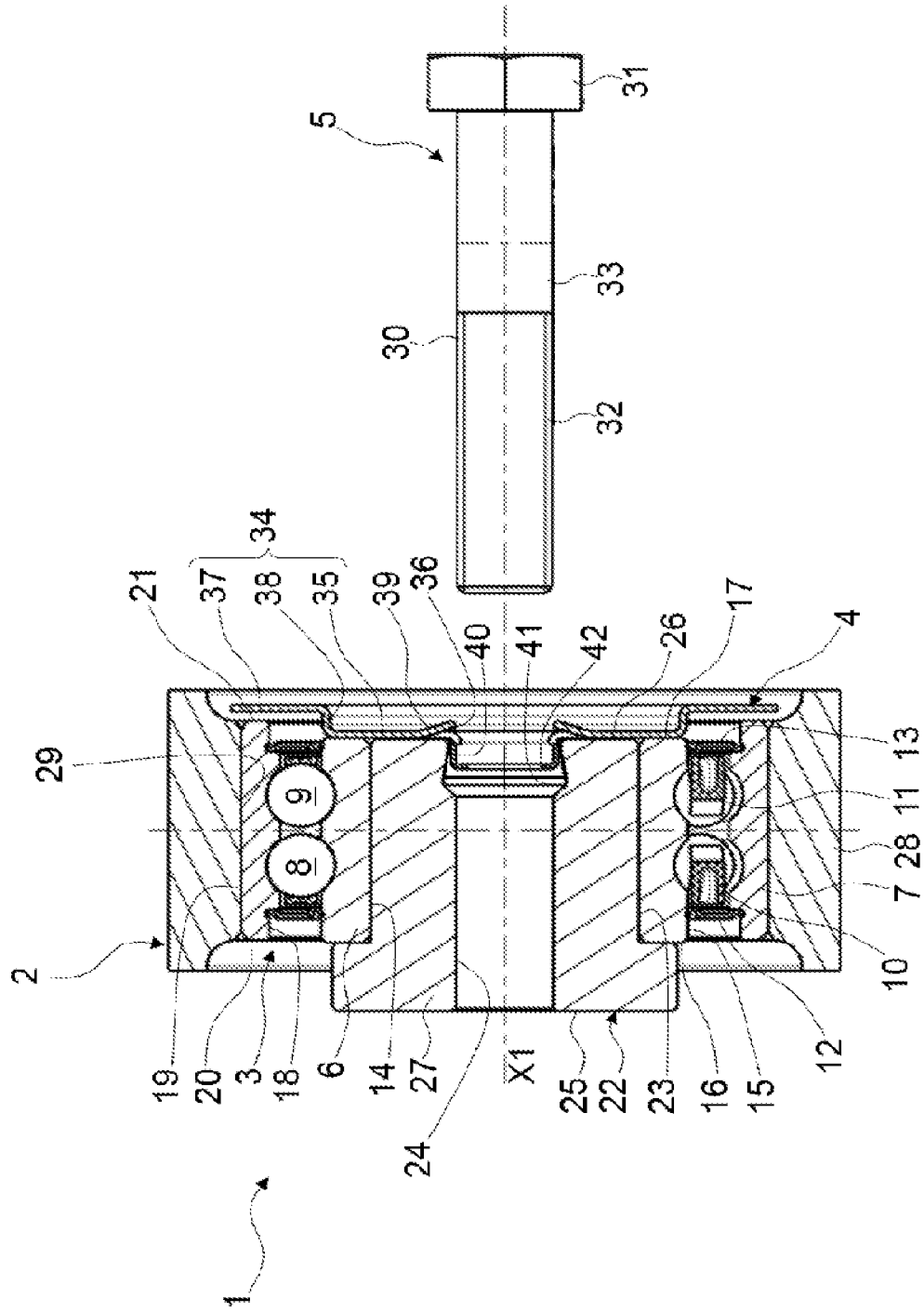
FIG. 5 is a view in axial section of a pulley device according to a second embodiment in an undeformed first configuration.
Figure 6:
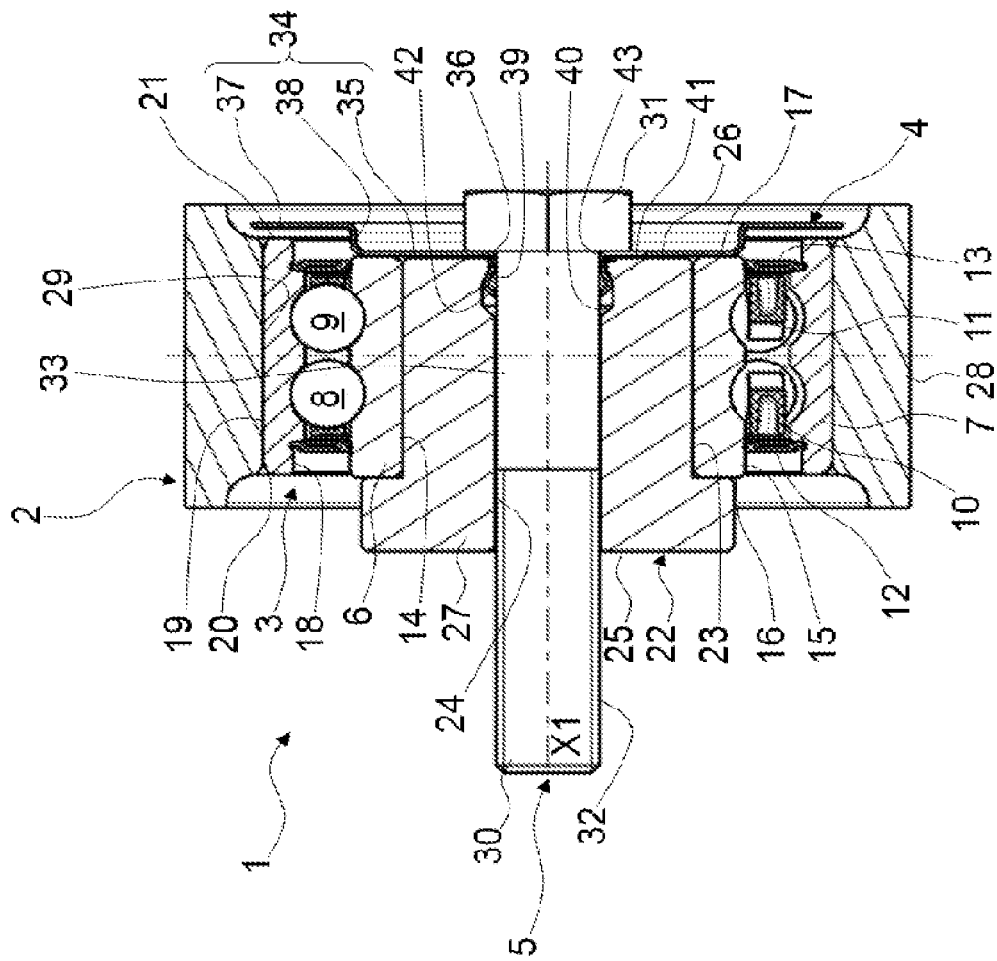
FIG. 6 is a view in axial section of the pulley device according to the second embodiment in a deformed and assembled second configuration.

According to a second embodiment of the invention shown in FIGS. 5 and 6, in which the same elements retain the same references, the axial portion 40 is provided at its free end with a radial rim 42 directed toward the interior of the device 1.

In the undeformed first configuration shown in FIG. 5, the radial rim 42 has an inside diameter strictly greater than the outside diameter of the body 30 of the screw 5. When the screw 5 is inserted in the bore 36 of the flange 4, the free end of the body 30 comes to abut against the rim 42.

In the deformed second configuration shown in FIG. 6, an axial force is applied by the screw 5 to the radial rim 42 so as to deform it axially in the direction of insertion of the screw 5 and, by virtue of an elbow connection, to deform the axial portion 40 radially outward. The axial portion 40 then comes to be housed in the circumferential groove 41, the body 30 of the screw 5 extending in the bore formed by the deformed radial rim 42. Thus, the flange 4 is fastened to the mounting bore 24 of the bearing 3. The radial rim 42 may advantageously serve as means for axial and radial retention of the screw 5. Alternatively, this deformation of the rim 42 and of the axial portion 40 may be produced by an external tool placed in the bore 36 once the flange 4 has been positioned on the bearing 3.

In an alternative manner not shown, the smooth portion 33 of the body 30 of the screw 5 may have an outside diameter strictly less than the outside diameter of the threaded portion 32 so as to form an annular groove in which the rim 42 of the axial portion 40 comes to be housed. This arrangement makes it possible to improve the axial retention of the screw.

Figure 7:
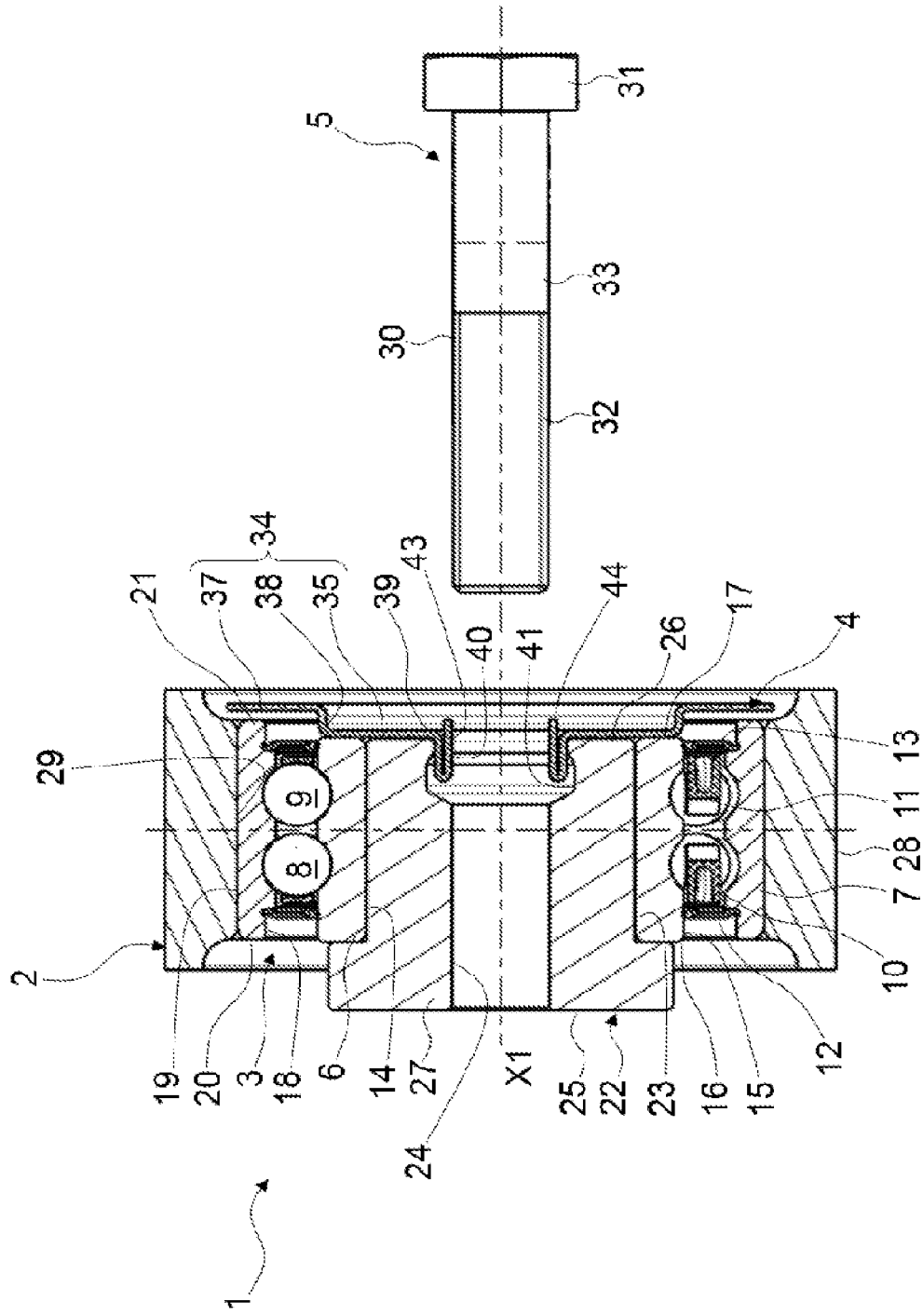
FIG. 7 is a view in axial section of a pulley device according to a third embodiment in an undeformed first configuration.
Figure 8:
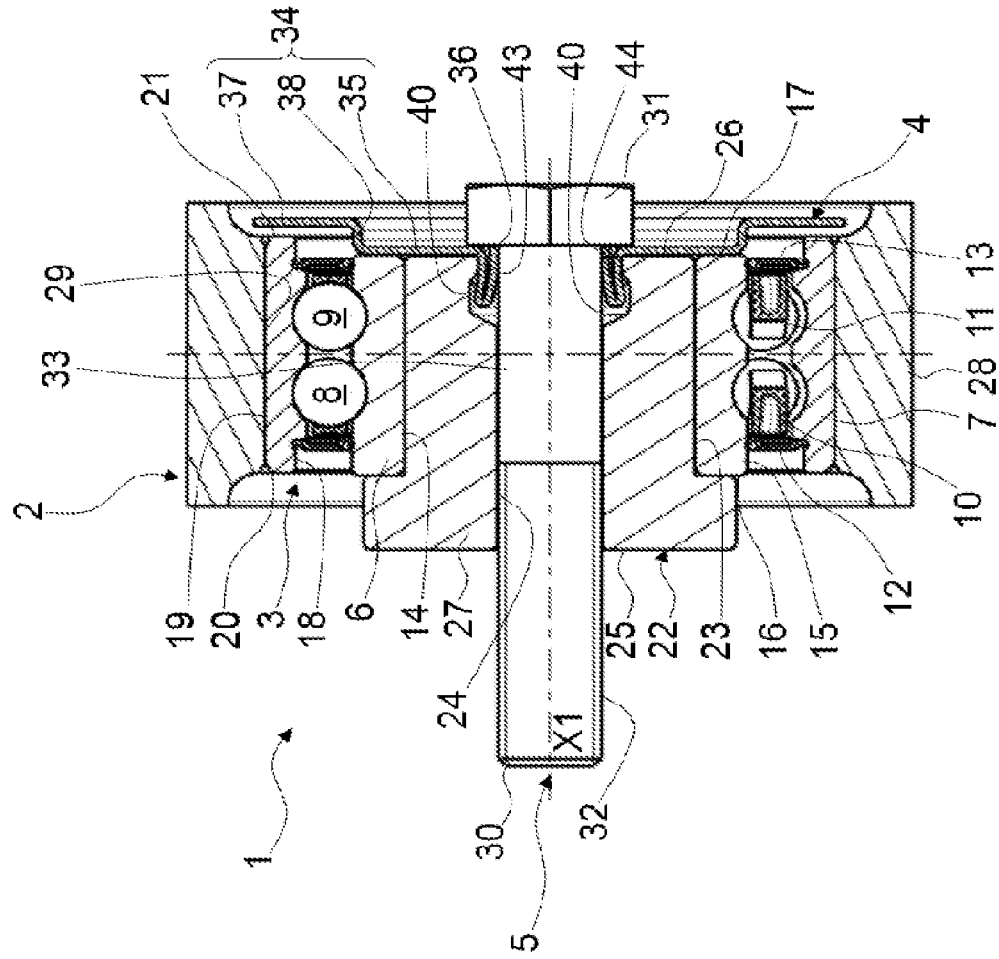
FIG. 8 is a view in axial section of the pulley device according to the third embodiment in a deformed and assembled second configuration.
Figure 9:
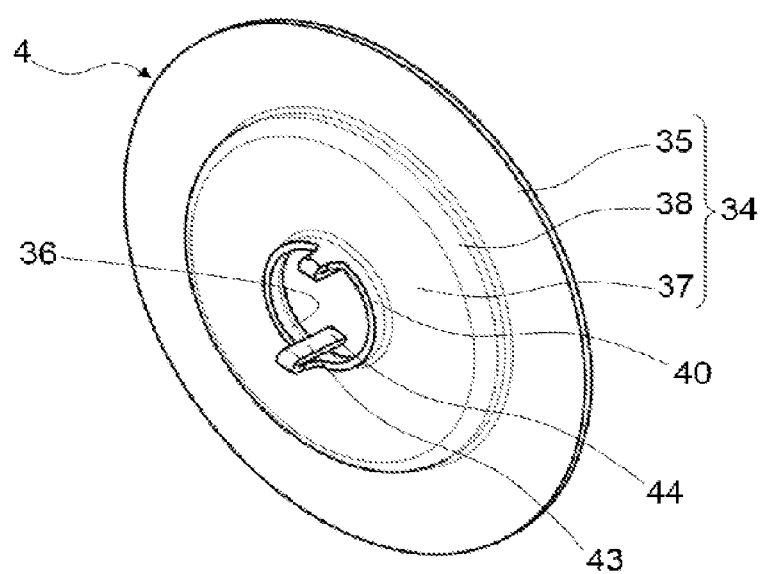
FIG. 9 is a rear perspective view of a flange for the pulley device from FIG. 7.

In a third embodiment of the invention shown in FIGS. 7 to 9, two tongues 43 extend axially from a free end of the axial portion 40 in the direction of the head 31 of the screw 5. Each of the tongues 43 is bent against the bore 36 of the axial portion 40. Each of the tongues 43 has an inside diameter strictly greater than the outside diameter of the body 30 of the screw 5 so as to allow insertion of the screw 5 without contact.

The tongues 43 are radially opposite one another and identical. Alternatively, the flange 4 may comprise a single tongue, or more than two.

In an undeformed first configuration shown in FIGS. 7 and 9, each of the tongues has a free end 44 extending axially beyond the first radial portion 35 of the flange 4.

In the deformed and assembled second configuration shown in FIG. 8, the head 31 of the screw 5 comes to bear against the projecting free ends 44 of the tongues 43. An axial force is applied by the screw 5 to the projecting free ends 44 so as to deform them axially in the direction of insertion of the screw 5 and, by virtue of an elbow and bend connection, to deform radially the axial portion 40 outwards. The axial portion 40 then comes to be housed in the circumferential groove 41, the body 30 of the screw 5 extending in the bore formed by the deformable tongues 43. The flange 4 is therefore fastened to the mounting bore 24 of the bearing 3. The tongues 43 may advantageously be configured so as to come to grip the smooth portion 33 of the screw 5 in order to provide the radial and axial retention of the screw 5 in its deformed and assembled mounting or second configuration. Alternatively, this deformation of the tongues 43 and of the axial portion 40 may be produced by an external tool pushing on the tongues 43 once the flange 4 is positioned on the bearing 3.

Moreover, the technical features of the various embodiments may be totally and only for some of them combined with one another. Thus, the pulley device may be adapted in terms of cost, performance and simplicity of use.

What is claimed is:

1. A pulley device for a belt tensioner or winder roller comprising:
    a pulley,
    a bearing with a rotating exterior race mounted to the pulley and a fixed inner race, the races being coaxial and the bearing including a mounting bore,
    a protection flange with an essentially radial portion bearing against a front surface of the bearing, an axial portion extending from an interior edge of the essentially radial portion, and a bore,
    a screw with a body housed in the bores of the bearing and of the flange, and a screw head at one end of the body, the head bearing against the essentially radial portion of the flange, wherein
    the axial portion of the flange is configured to pass from an undeformed first configuration to a deformed second configuration, wherein
    the undeformed first configuration corresponds to an axial portion that extends in an axial or partially inclined direction toward the interior of the device, the outside diameter of the axial portion being less than the inside diameter of the mounting bore of the bearing, and wherein
    the deformed second configuration corresponds to the axial portion deformed radially toward the exterior of the device such that the axial portion comes to be housed in a circumferential groove provided in the mounting bore of the bearing, wherein the axial portion forms an axially outermost portion of the protection flange when the axial portion is in the deformed second configuration,
    the essentially radial portion defining a plurality of slots therein such that at least one tongue is formed therein, the tongue having a free end and a base end, the free end being deformed axially away from the axial portion such that force is exerted on the fastener head when the fastener head is fully inserted through the protective flange, the base end being located medially along the essentially radial portion.

2. The pulley device according to claim 1, wherein the inner race of the bearing comprises a bore forming the mounting bore of the bearing.

3. The pulley device according to claim 1, wherein the bearing comprises an annular spacer disposed between the inner race and the body of the screw having an exterior surface mounted in a bore in the inner race, a front surface against which the essentially radial portion of the flange comes to bear, and a bore forming the mounting bore of the bearing in which the body of the screw is housed.

4. The pulley device according to claim 1, wherein the flange comprises retaining means for the screw.

5. The pulley device according to claim 1, wherein the axial portion comprises at its free end a radial rim directed toward the interior of the device so that, in the undeformed first configuration, the radial rim has an inside diameter less than the outside diameter of the body of the screw.

* * * * *